United States Patent
Schaller et al.

(10) Patent No.: US 9,026,249 B2
(45) Date of Patent: May 5, 2015

(54) ROBOT CALIBRATION METHOD

(71) Applicant: Varian Semiconductor Equipment Associates, Inc., Gloucester, MA (US)

(72) Inventors: Jason M. Schaller, Austin, TX (US); Robert Brent Vopat, Austin, TX (US); James R. McLane, Beverly, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 91 days.

(21) Appl. No.: 14/018,909

(22) Filed: Sep. 5, 2013

(65) Prior Publication Data

US 2014/0081456 A1 Mar. 20, 2014

Related U.S. Application Data

(60) Provisional application No. 61/702,377, filed on Sep. 18, 2012.

(51) Int. Cl.
*G05B 19/04* (2006.01)
*G05B 19/18* (2006.01)
*G05B 19/408* (2006.01)
*B25J 9/16* (2006.01)

(52) U.S. Cl.
CPC ........... *G05B 19/4086* (2013.01); *B25J 9/1692* (2013.01); *B25J 9/1697* (2013.01); *G05B 2219/39016* (2013.01); *G05B 2219/39022* (2013.01); *G05B 2219/40607* (2013.01)

(58) Field of Classification Search
CPC combination set(s) only.
See application file for complete search history.

(56) References Cited

U.S. PATENT DOCUMENTS

2009/0098667 A1   4/2009 Behler et al.

FOREIGN PATENT DOCUMENTS

| EP | 2481529 A1 | 8/2012 |
| EP | 2497611 A2 | 9/2012 |
| WO | 2012/027541 A1 | 3/2012 |

OTHER PUBLICATIONS

International Search Report and Written Opinion mailed Dec. 20, 2013 for PCT/US2013/058888 filed Sep. 10, 2013.

*Primary Examiner* — Bhavesh V Amin

(57) ABSTRACT

A robot calibration method which aligns the coordinate system of a gantry module with the coordinate system of a camera system is disclosed. The method includes using an alignment tool, which allows the operator to place workpieces in locations known by the gantry module. An image is then captured of these workpieces by the camera system. A controller uses the information from the gantry module and the camera system to determine the relationship between the two coordinate systems. It then determines a transformation equation to convert from one coordinate system to the other.

13 Claims, 6 Drawing Sheets

ROBOT CALIBRATION METHOD

This application claims priority of U.S. Provisional Application Ser. No. 61/702,377, filed Sep. 18, 2012, the disclosure of which is incorporated herein by reference in its entirety.

FIELD

This invention relates to workpiece processing and, more particularly, to calibration of a robot used for workpiece processing.

BACKGROUND

Ion implantation is a standard technique for introducing conductivity-altering impurities into a workpiece. A desired impurity material is ionized in an ion source, the ions are accelerated to form an ion beam of prescribed energy, and the ion beam is directed at the surface of the workpiece. The energetic ions in the beam penetrate into the bulk of the workpiece material and are embedded into the crystalline lattice of the workpiece material to form a region of desired conductivity.

Two concerns of the solar cell manufacturing industry are manufacturing throughput and cell efficiency. Cell efficiency measures the amount of energy converted into electricity. Higher cell efficiencies may be needed to stay competitive in the solar cell manufacturing industry. However, manufacturing throughput cannot be sacrificed at the expense of increased cell efficiency.

Ion implantation has been demonstrated as a viable method to dope solar cells. Use of ion implantation removes process steps needed for existing technology, such as diffusion furnaces. For example, a laser edge isolation step may be removed if ion implantation is used instead of furnace diffusion because ion implantation will only dope the desired surface. Besides removal of process steps, higher cell efficiencies have been demonstrated using ion implantation. Ion implantation also offers the ability to perform a blanket implant of an entire surface of a solar cell or a selective (or patterned) implant of only part of the solar cell. Selective implantation at high throughputs using ion implantation avoids the costly and time-consuming lithography or patterning steps used for furnace diffusion. Selective implantation also enables new solar cell designs. Any improvement to manufacturing throughput of an ion implanter or its reliability would be beneficial to solar cell manufacturers worldwide. This may accelerate the adoption of solar cells as an alternative energy source.

SUMMARY

A robot calibration method which aligns the coordinate system of a gantry module with the coordinate system of a camera system is disclosed. The method includes using an alignment tool, which allows the operator to place workpieces in locations known by the gantry module. An image is then captured of these workpieces by the camera system. A controller uses the information from the gantry module and the camera system to determine the relationship between the two coordinate systems. It then determines a transformation equation to convert from one coordinate system to the other.

According to a first embodiment, a method of calibrating a robot is disclosed. The method comprises attaching an alignment tool to an end effector of the robot, where the end effector is part of a gantry module, where the alignment tool comprises one or more spaces, each space having three respective fingers; moving the end effector to a first location within a field of view of a camera; lowering the end effector; placing a respective workpiece in one or more of the spaces while pressing each workpiece against the respective three fingers, while the end effector is in the first location; saving a first set of coordinate locations for each space in the first location using a coordinate system referenced to the gantry module; moving the end effector without affecting a position of the workpieces from the first location to a second location within the field of view; placing a respective workpiece in one or more of the spaces while pressing each workpiece against the respective three fingers, while the end effector is in the second location; saving a second set of coordinate locations for each space in the second location using a coordinate system referenced to the gantry module; moving the end effector without affecting a position of the workpieces from the second location to a location outside the field of view; using the camera to capture an image of the workpieces after the end effector is moved to the location outside the field of view; determining a third set of coordinate locations for each workpiece using a coordinate system referenced to the camera; and calculating a transformation equation to transform coordinate locations in the coordinate system referenced to the camera to coordinate locations in the coordinate system referenced to the gantry module, using the first set, the second set and the third set of coordinate locations.

According to a second embodiment, a method of calibrating a robot is disclosed. The method comprises performing an optical normalization process to determine vertical and horizontal conversion factors for a camera so as to convert pixel locations on an image captured by the camera to physical dimensions in a field of view of the camera; attaching an alignment tool to an end effector of the robot, where the end effector is part of a gantry module, where the alignment tool comprises one or more spaces, each space having three respective fingers; moving the end effector to a first location within the field of view of the camera; lowering the end effector; placing at least two workpieces in respective spaces by pressing each workpiece against the respective three fingers, while the end effector is at the first location; saving a first set of coordinate locations for each space using a coordinate system referenced to the gantry module; moving the end effector without affecting a position of the workpieces from the first location to a location outside the field of view; using the camera to capture an image of the workpieces after the end effector is moved to the location outside the field of view; determining a second set of coordinate locations for each workpiece using a coordinate system referenced to the camera; and calculating a transformation equation to transform coordinate locations in the coordinate system referenced to the camera to coordinate locations in the coordinate system referenced to the gantry module based on the first set and the second set of coordinate locations.

According to a third embodiment, a workpiece handling system is disclosed. The workpiece handling system comprises a gantry module comprising an end effector; an alignment tool attached to the end effector, having a plurality of spaces, each space having three respective fingers and each space configured to accept a workpiece; one or more conveyor belts; a camera disposed above the conveyor belts; and a controller in communication with the camera and the gantry module, comprising a storage element comprising instructions, which when executed, perform a method of calibrating the system, the method comprising moving the end effector to a first conveyor belt within a field of view of the camera; lowering the end effector; waiting until a user places at least two workpieces on the first conveyor belt in respective spaces by pressing each workpiece against the respective three fingers; saving a first set of coordinate locations for each space using a coordinate system referenced to the gantry module; moving the end effector without affecting a position of the workpieces from the first conveyor belt to a location outside the field of view; using the camera to capture an image of the workpieces after the end effector has moved to the location outside the field of view; determining a second set of coordinate locations for each workpiece using a coordinate system referenced to the camera; and calculating a transformation equation to transform coordinate locations in the coordinate system referenced to the camera to coordinate locations in the coordinate system referenced to the gantry module based on the first set and the second set of coordinate locations.

BRIEF DESCRIPTION OF THE DRAWINGS

For a better understanding of the present disclosure, reference is made to the accompanying drawings, which are incorporated herein by reference and in which.

DETAILED DESCRIPTION

Embodiments of the calibration method are described herein in connection with an ion implanter. However, the calibration method can be used with other systems and processes involved in solar cell or semiconductor manufacturing or other systems that process workpieces. Thus, the invention is not limited to the specific embodiments described below.

Figure 1:
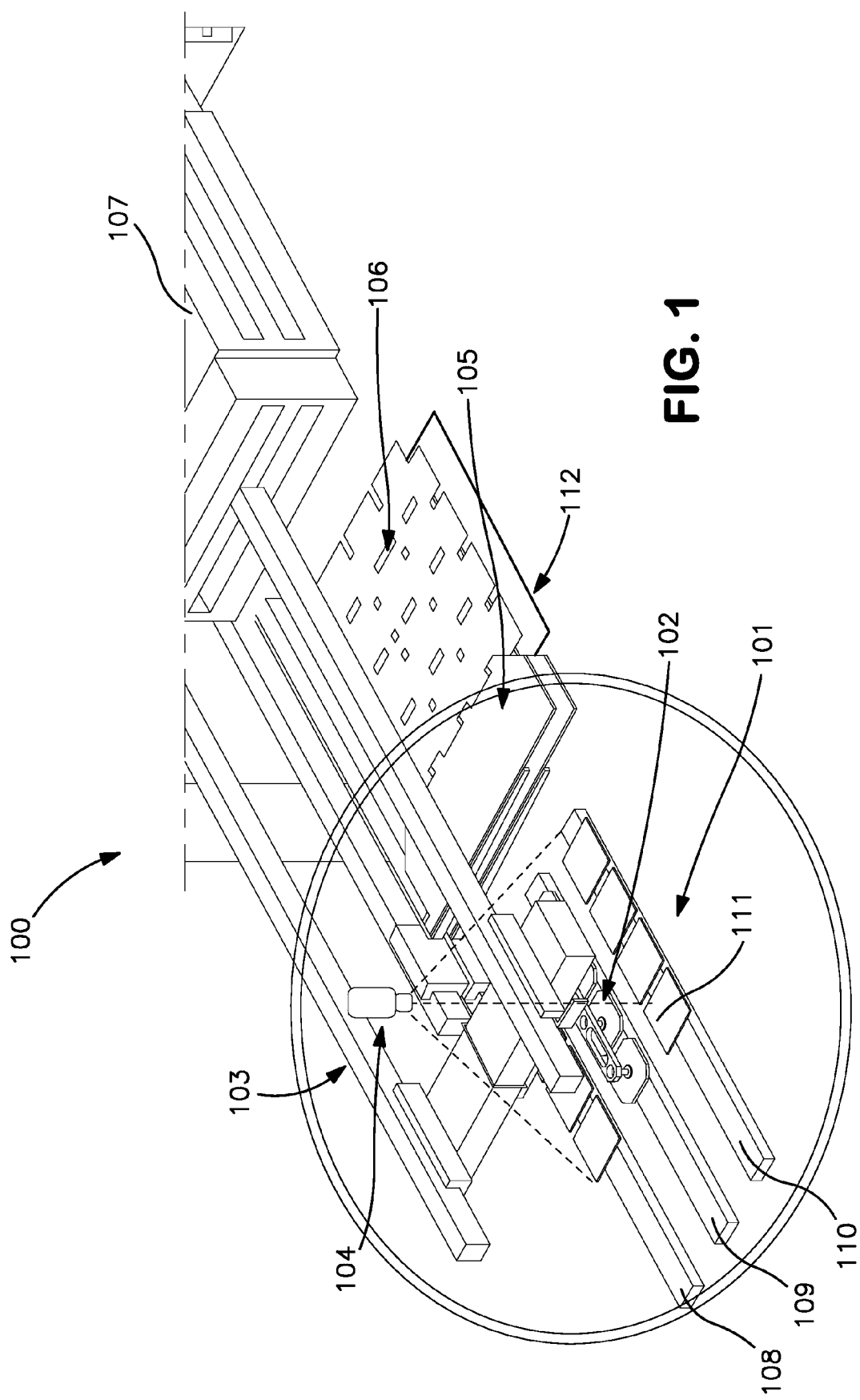
FIG. 1 is a perspective view of a workpiece handling system.

FIG. 1 is a perspective view of a workpiece handling system. The system 100 is connected to one or more load locks 107. Workpieces 111, which may be solar cells, semiconductor wafers, or other workpieces known to those skilled in the art, are placed on the conveyor belts 108, 109, 110 and are either loaded onto or unloaded from the carrier build station 112 by the matrix end effector 102 of the gantry module 103. In one embodiment, the matrix end effector 102 can pick up four workpieces 111 simultaneously for transport, though other numbers are possible. This gantry module 103 transports workpieces 111 from the conveyor belts 108, 109, 110 in the belt module 101 to the carrier build station 112 using the matrix end effector 102. The gantry module 103 also transports workpieces 111 from the carrier build station 112 to the belt module 101 using the matrix end effector 102. The matrix end effector 102 can hold multiple workpieces 111 simultaneously and can individually reposition these workpieces 111 to enable proper alignment during transport. The swap end effector 105 either loads or unloads the cell matrix/carrier 106 from the load lock 107. The workpieces 111 sit on or in the cell matrix/carrier 106. A camera 104 is positioned above or on the gantry module 103. While three conveyor belts 108, 109, 110 are shown, the disclosure is not limited to any particular number of belts.

A controller (not shown) may be in communication with the gantry module 103, so as to be able to control the movements of the end effector 102. The controller may also be in communication with the camera 104, so as to receive data from the camera 104. This data may be pixel information, or may be data that has been already processed by a processor contained within the camera 104. The controller may also have a storage element electrically coupled thereto. The storage element may contain instructions and other information. The instructions may enable the controller to perform all of the steps, processes and methods described herein.

The camera 104 can be used to determine the position of the workpieces 111 on one of the conveyor belts 108, 109, 110. The gantry module 103 uses this position information to determine where to pick up the workpieces 111 for transport. A relationship needs to be established between the coordinate systems for the camera 104 and the gantry module 103. The camera 104 returns absolute position data (Xc, Yc) and rotation (Rc) for the workpieces 111 on one of the conveyor belts 108, 109, 110. The gantry module 103 operates in a different Cartesian coordinate system (Xg, Yg, Rg). These two coordinate systems may be misaligned because there is no physical reference between the two coordinate systems. Misalignment also may occur due to tolerance or assembly of the camera 104 or gantry module 103. The different X, Y, and R directions between the two coordinate systems may occur due to differences in movement definition or software of the camera 104 or gantry module 103. The points in the camera 104 coordinate system can be converted to or expressed in the coordinate system for the gantry module 103 using transformation equations. Control of the camera 104 and the gantry module 103 is performed by a processor (not shown)

Figure 2:
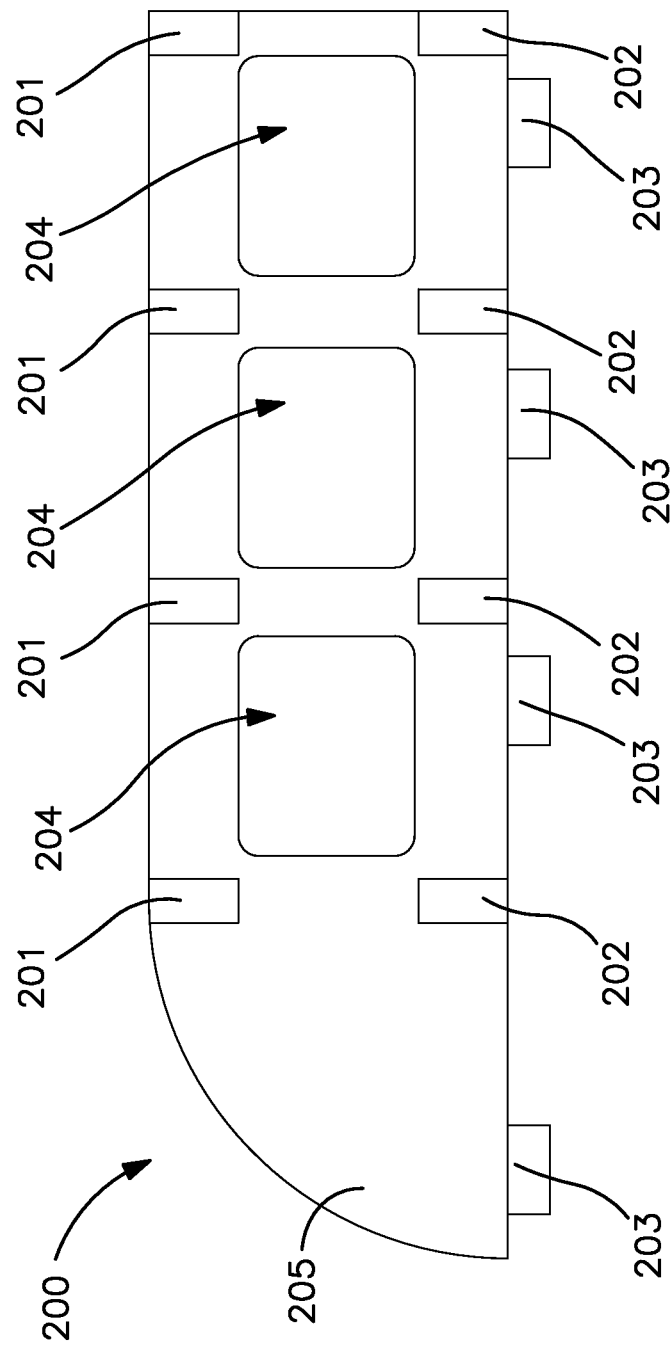
FIG. 2 is a top perspective view of an alignment tool for the gantry module of FIG. 1.
Figure 3:
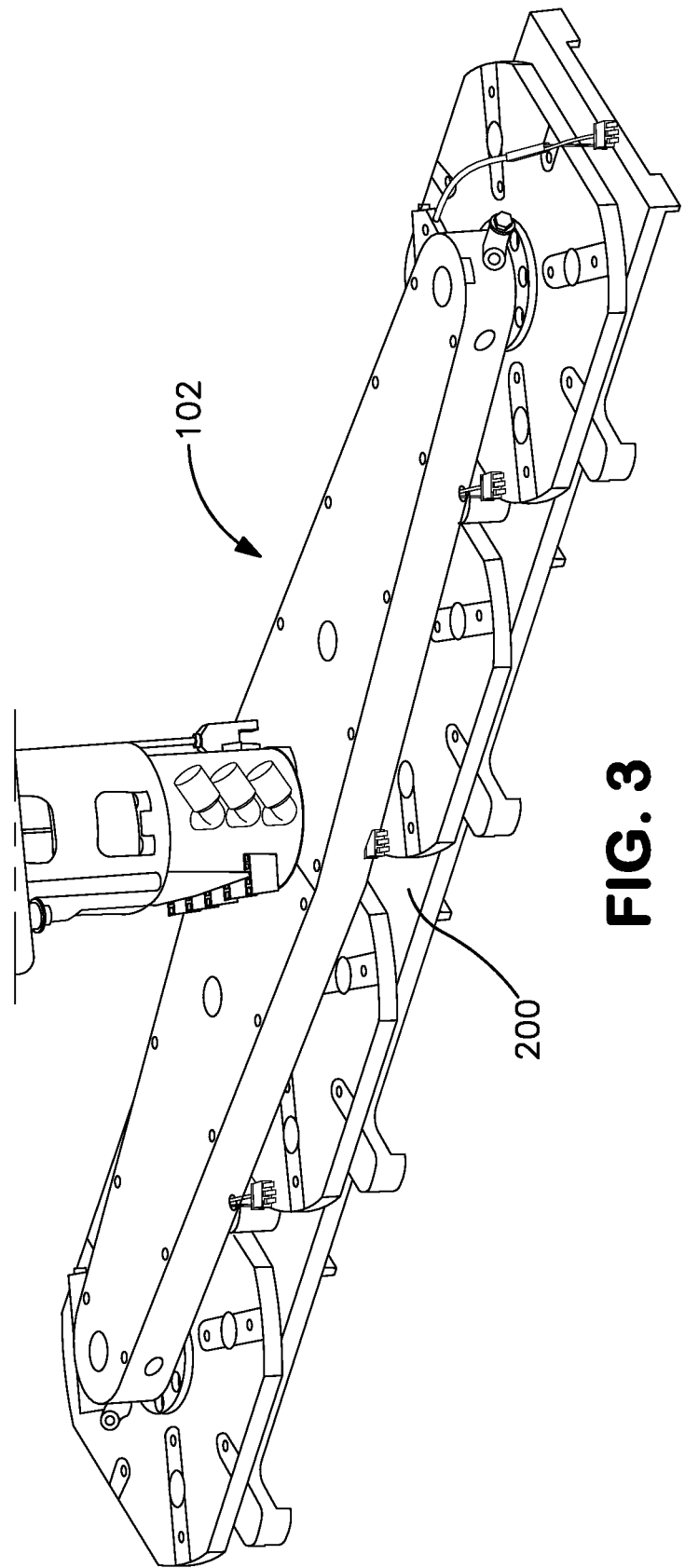
FIG. 3 is a perspective view of the alignment tool of FIG. 2 connected to the end effector of FIG. 1.

FIG. 2 is a top perspective view of an alignment tool for the gantry module of FIG. 1. The alignment tool 200 attaches below the end effector 102 to the main support arm using pins to align it to the arm. The alignment tool 200 has a plate 205 with openings 204. In this instance, it has three openings 204. In some embodiments, the openings 204 are included to reduce the weight of the alignment tool 200. In other embodiments, there are fewer or no openings 204 in the alignment tool 200. The alignment tool 200 also has fingers 201, 202, 203 that extend away from the plate 205, and are disposed on the bottom surface of the alignment tool. Thus, the fingers 201, 202, 203 extend downward and may contact the conveyor belt 108, 109, 110, while the rest of the alignment tool 200 is disposed above the belts, thereby allowing workpieces 111 to be placed under the alignment tool 200. In another embodiment, the fingers 201, 202, 203 are disposed on the alignment tool 200 such that they straddle the conveyor belt 108, 109, 110. In this embodiment, the fingers 201, 202, 203 do not contact the conveyor belts, however a region is still created between the underside of the alignment tool 200 and the top surface of the conveyor belts 108, 109, 110, thereby allowing workpieces to be placed under the alignment tool 200. Furthermore, these three fingers are configured such that finger 201 and finger 202 form a line segment, and the third finger 203 is disposed nonlinearly and beyond the endpoints of this line segment. This allows the workpiece to contact the fingers 201, 202 with one side and an adjacent perpendicular side contacts the third finger 203. For example, a workpiece 111 disposed on the conveyor belt may contact at least one finger 201, at least one finger 202, and at least one finger 203. Each respective set of one finger 201, one finger 202 and one finger 203 define a space into which the workpiece 111 can be disposed. The workpiece may be exposed through one of the openings 204. In one embodiment, four workpieces are aligned in the four spaces defined by the respective sets of fingers 201, 202, 203 of the alignment tool 200. FIG. 3 is a perspective view of the alignment tool of FIG. 2 connected to the end effector 102 of FIG. 1.

Figure 4:
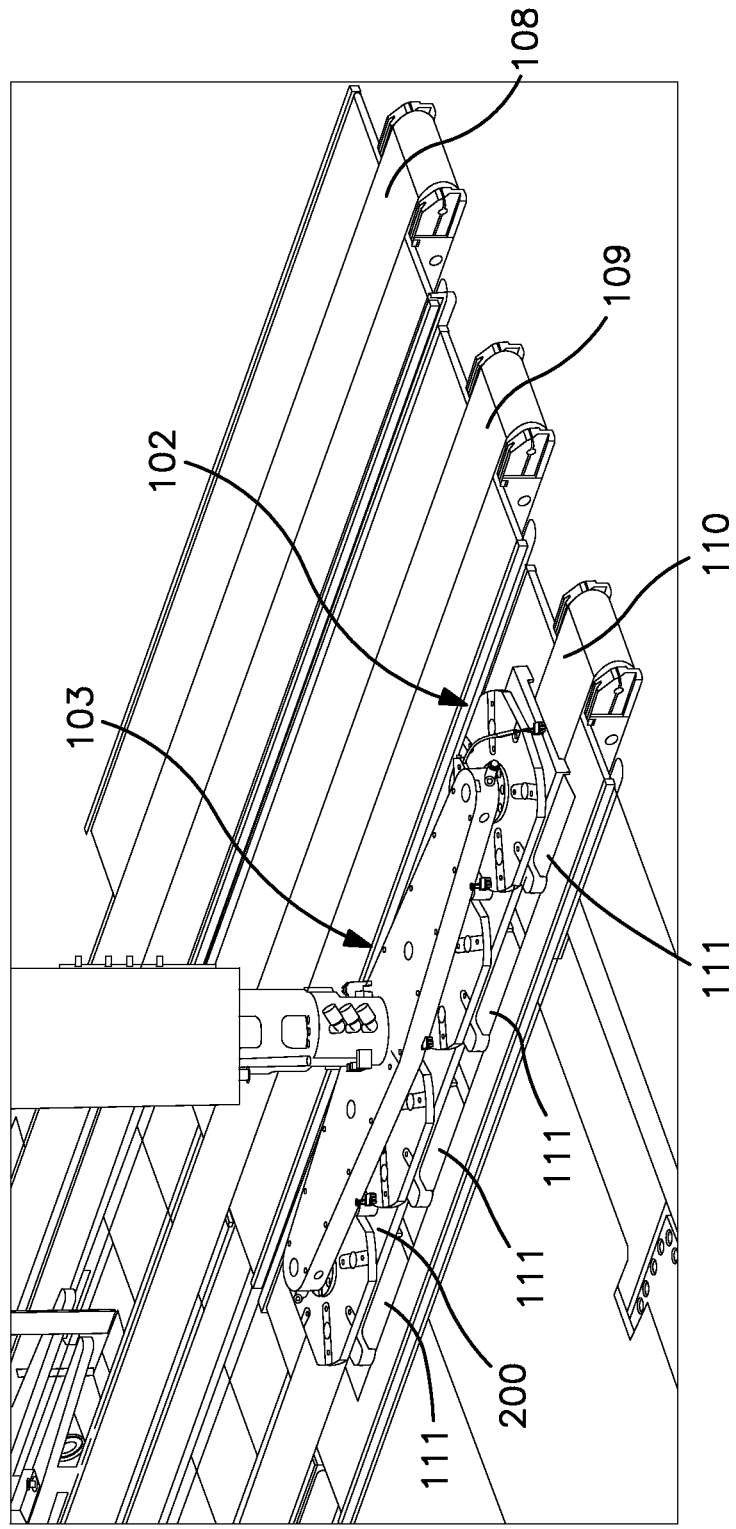
FIG. 4 is a perspective view of a first embodiment of calibration.

FIG. 4 is a perspective view of a first embodiment of calibration. The alignment tool 200 is installed on the end effector 102 of the gantry module 103. The end effector 102 is then moved to a known coordinate location on conveyor belt 110. The end effector 102 is then lowered. An operator places four workpieces 111 on the conveyor belt 110. The operator places each workpiece 111 in one of the four spaces define by a respective set of three fingers 201, 202, 203. The operator then pushes each workpiece 111 against the respective set of fingers 201, 202, 203 (illustrated in FIG. 2) of the alignment tool 200 on the end effector 102 of the gantry module 103. This provides three points of contact for each workpiece 111 and aligns the workpieces 111 to a specific and known location on the conveyor belt 110 and with respect to the gantry module 103. Once the workpieces 111 are in contact with the fingers of the alignment tool 200, there is a known relationship with respect to the coordinate system of the gantry module 103 in the Xg, Yg, and Rg directions. For example, each workpiece may have the same Xg coordinate and a different Yg coordinate. Since the gantry module 103 cannot actually determine where the workpieces are placed, these coordinates are based on the known positions of each respective space in the alignment tool 200. It is therefore assumed when establishing Xg, Yg, Rg coordinates for these workpieces, that each workpiece has been properly aligned in its respective space.

The end effector 102 of the gantry module 103 is then removed from the area of the conveyor belt 110 so as to leave the field of view of the camera 104. The workpieces 111 are left on the conveyor belt 110. The end effector 102 is removed without affecting the position of the workpieces 111. In one embodiment, workpieces 111 may then be disposed on the other conveyor belts 108, 109 using the same method. In this manner, there will be four workpieces 111 on each of the conveyor belts 108, 109, 110, for a total of twelve workpieces.

The end effector 102 of the gantry module 103 is then removed from the area of the conveyor belts 108, 109, 110. The camera (illustrated in FIG. 1) takes an image of the workpieces 111 on the conveyor belts 108, 109, 110 and returns Xc, Yc, and Rc data for each workpiece 111 to the processor. There is a specific relationship between the Xc, Yc, and Rc data for each workpiece 111 measured by the camera and the Xg, Yg, and Rg data established by the alignment tool 200 on the gantry module 103.

The Xc, Yc and Rc data can be formatted in various ways. In one embodiment, the Xc and Yc values may be expressed as pixel locations on the image. This format may be used if there is no predetermined relationship between pixels and physical dimensions. Thus, the calibration process in this embodiment not only aligns the two coordinate systems, not also handles the conversion from pixel location to physical dimensions. The gantry coordinates (Xg, Yg) may be expressed in linear units of measurement, such as millimeters, inches, centimeters, or other suitable units.

The processor uses the three points in the coordinate system (X, Y, and R) for the camera and the gantry module 103 to determine constants for the coordinate system transform equation. Once these constants are determined, the Xc, Yc, and Rc for each workpiece 111 can be transformed or converted into Xg, Yg, and Rg using an equation. These may be transformation equations in one instance and a transformation matrix may also be used.

Thus, in one embodiment, twelve workpieces 111 are disposed on the conveyor belts (four on each conveyor belt). The coordinate positions (Xg, Yg, Rg) for each of the twelve workpieces 111 are known by the gantry module. In some embodiments, the coordinates are referenced to the geometric center of the space or workpiece. In other words, the coordinates (Xg, Yg, Rg) imply that the center of the workpiece is at (Xg, Yg) and the workpiece is rotated by an angle of Rg from the nominal orientation. Of course, other conventions can be used. For example, the (Xg,Yg) may refer to a particular corner of the workpiece, rather than the center. Once the camera captures an image of these twelve workpieces 111, the processor can determine the coordinate positions (Xc, Yc, Rc) of each of these workpieces 111. Like the gantry coordinate system, the camera coordinate system may use the geometric center of the workpiece as the (Xc, Yc) location. However, other points on the workpiece may also be used. In some embodiments, it is preferable that the two coordinate system use the same convention (i.e. both reference the geometric center of the workpiece). Using these twelve sets of points, a set of coordinate system transformation equations may be created. These transformation equations can be used to create a set of transformation matrices, Tx, Ty, and Tr. Using these equations or matrices, any camera position (Xc, Yc, Rc) may be translated to a corresponding gantry position (Xg, Yg, Rg).

In some embodiments, less than twelve workpieces may be used for the alignment and transformation process. For example, in one embodiment, one workpiece may be disposed on conveyor belt 110 and one workpiece may be disposed on conveyor belt 108. These two workpieces may be disposed in different spaces within the end effector 102, so that their respective coordinates (Xg and Yg) are both different. In other words, only two sets of coordinate positions, generated using exactly two workpieces, may be required to determine the constants for the coordinate system transformation equation.

However, there may be some inaccuracy where the user places workpieces 111 on a conveyor belt against the fingers of the alignment tool 200. Therefore, in some embodiments, the use of four or more workpieces may average any errors or inaccuracies caused by misplacement by the user. Once the coordinate system transform equation is developed by the processor, the original coordinates as measured by the camera 104 can be entered into the equation and converted into the gantry module coordinate system. This can be compared against the known positions of the workpieces using the gantry module coordinate system to determine error. The equations can be altered to remove the error if needed.

Figure 5:
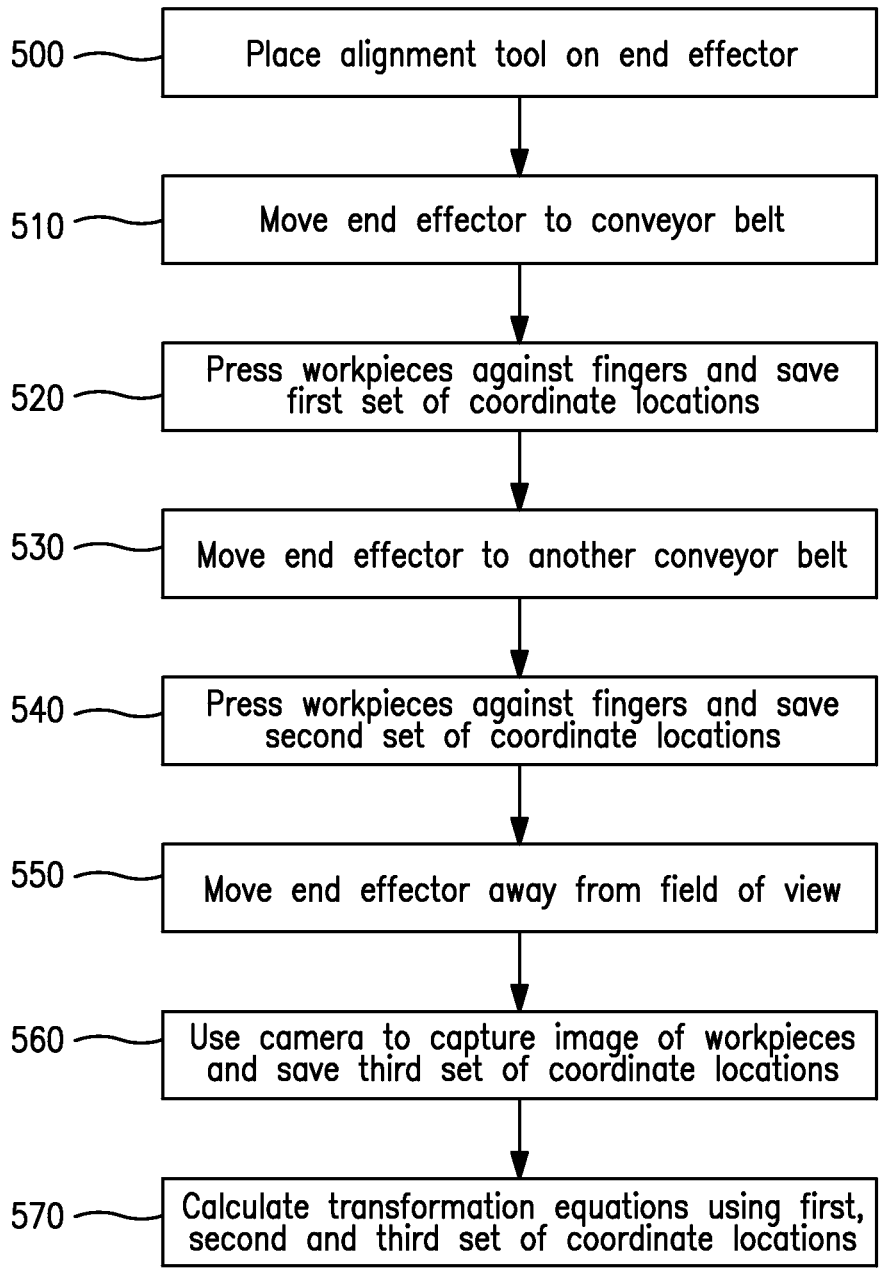
FIG. 5 is a flowchart showing a calibration method according to a first embodiment.

Thus, according to one embodiment, a method of calibrating a vision coordinate system to a gantry coordinate system is disclosed. This method is illustrated in FIG. 5. First, the alignment tool 200 is attached to the end effector 102 (see Box 500). The alignment tool has downward projecting fingers, which provide three points of contact for each workpiece 111. The end effector 102 is then moved so as to be disposed on a conveyor belt 110 (see Box 510). As described above, in some embodiments, the fingers 201, 202 and 203 may contact the conveyor belt 110. In other embodiments, the fingers 201, 202, 203 straddle the conveyor belt and do not make contact. Note that while the location is described as a conveyor belt, the disclosure is not limited. For example, the end effector 102 may be moved to any location within the field of view of the camera 104. The user then places at least one workpiece 111 into a space defined by a respective set of fingers 201, 202, 203. The workpiece 111 is then pushed by the operator so as to contact all three of fingers 201, 202, 203 (see Box 520). A first set of gantry positions (Xg, Yg, Rg) for each space within the end effector 102 is saved. The end effector 102 is then moved to a second conveyor belt (see Box 530). The user then places at least one workpiece 111 into a space defined by a respective set of fingers 201, 202, 203 (see Box 540). This may be a different space that was used for the previous workpiece. A second set of gantry positions (Xg, Yg, Rg) for each space within the end effector 102 is saved. Note that in some embodiments, the gantry positions (Xg, Yg, Rg) of each conveyor belt are already known. Thus the end effector 102 is only moved to allow the physical placement of the workpieces 111, which is needed by the camera system. The gantry module is then moved away from the field of view of the camera 104 (see Box 550). The camera 104 then captures an image of the workpieces 111, and determines a third set of coordinate locations based on camera coordinates (Xc, Yc, Rc) (see Box 560). Based on the first set, the second set and the third set of coordinate positions, transformation equations can be generated by the processor (see Box 570). As described above, the use of more than two workpieces may improve the accuracy of the transformation equations. In this embodiment, the coordinate system of the camera may be expressed in pixels, while the coordinate system of the gantry module may be expressed in linear units of measure. Thus, the transformation equation may correct for misalignment between the systems and may also calculate the conversion from pixels to linear units of measure.

In another embodiment, the camera image may be normalized prior to the calibration process. For example, an image having a known pattern of fixed dimensions may be disposed on the conveyor belts 108, 109, 110. This pattern may be a pattern of squares, such as a checkerboard pattern, although other patterns are also possible. The camera 104 captures an image of this pattern. Since the dimensions of the pattern are known, the vision system of the camera 104 can be normalized. For example, the horizontal and vertical conversion factors (i.e. the number of pixels in an inch in each direction) can be determined. Thus, the conversion factors allow pixel locations to be converted to physical dimensions within the field of view of the camera. Furthermore, distortion, which may be common especially along the outer edges of the field of vision, can be calculated and compensated for. For example, the horizontal and vertical conversion factors may vary throughout the field of vision. This optical normalization method is used to account for and compensate for those changes. Thus, after completion of the optical normalization process, distortion caused by the camera lens can be removed, and physical dimensions can be determined based on the vertical and horizontal conversion factors. Thus, in this embodiment, the (Xc, Yc) coordinates may be expressed in the same units of linear measurement (i.e. inches or millimeters) as the gantry (Xg, Yg) coordinates.

After the optical normalization process has been completed, the calibration process may be performed. In one embodiment, the calibration process is performed as described above, where workpieces are disposed on at least two different conveyor belts. As described above, there may be as few as two workpieces, or as many as twelve workpieces used during the calibration process in this embodiment.

Figure 6:
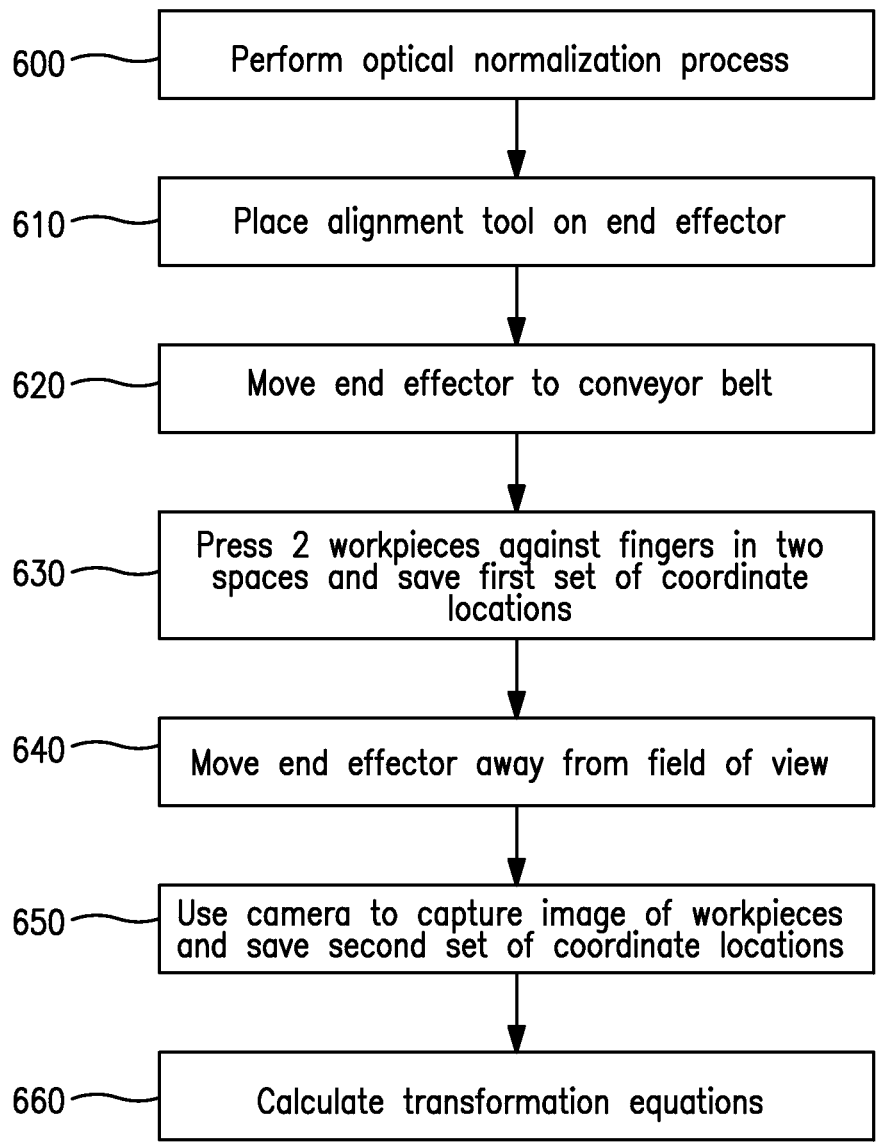
FIG. 6 is a flowchart showing a calibration method according to a second embodiment.

However, in another embodiment, a simplified calibration process, shown in FIG. 6, may be employed. In this embodiment, first the optical normalization process is executed (see Box 600). This may be done immediately prior to the calibration process, or may be done at a different time prior to the calibration process. Next, the alignment tool 200 is placed on the end effector 102 (see Box 610). The end effector 102 is then moved to one of the conveyor belts 110 and lowered (see Box 620). The user then places a workpiece in two of the spaces defined by a respective set of fingers. These workpieces 111 are pressed up against their respective set of fingers 201, 202, 203 (see Box 630). The first set of coordinate locations for each space, references to the gantry module, are saved. The end effector 102 is then lifted without affecting the placement of the workpieces 111 and moved out of the field of vision of the camera 104 (see Box 640). The camera 104 then captures an image of these two workpieces 111 (see Box 650). A second set of coordinate locations, referenced to the camera system (Xc, Yc, Rc) are saved. The processor then performs the necessary calculations to generate the transform equations using this first set and second set of coordinate locations (see Box 660).

Since the camera coordinates are in the same units as the gantry module, the transformation is used to correct primarily for two parameters. First, although both systems use the same units, they may have different origins for their respective coordinate systems. Thus, the calibration process allows the creation of a common origin for the two systems. Secondly, the two coordinate systems may be slightly rotated with relative to each other. The calibration process also corrects any rotational differences between the coordinate systems. Finally, any nominal variations in measurement can also be addressed.

Thus, in this mode, it is not necessary to repeat this process for another conveyor belt, as the optical normalization process has already determined the conversion factors in the orthogonal direction. Thus, the placement of two workpieces 111 on one conveyor belt allows the calibration process to determine one axis for the gantry module and calibrate this to the same axis for the camera system. The other axis is then defined as being perpendicular to this axis. Thus, only two workpieces 111, disposed on the same conveyor belt are required to complete the calibration process, when used in conjunction with an optical normalization process. The two workpieces are used to define the origin, which may be, for example, the coordinates of the workpiece disposed in the first space on the alignment tool 200 on conveyer belt 110. The combination of the two workpieces defines a line, which is assumed to be the X axis of each system. Using the camera coordinates of each workpiece, a line can be created and compared to the equation of that same line in the gantry coordinate system. This allows the angle of rotation to be determined.

In another embodiment, additional workpieces 111 are used in the calibration process of FIG. 6. For example, four workpieces 111, one in each space defined by a respective set of fingers 201, 202, 203 on the alignment tool 200 may be used. The use of additional workpieces 111, as described above, may improve the accuracy of the transform equations. For example, in one embodiment, rather than using only two workpieces to create a line, additional workpieces, which provide additional coordinate locations, are used to create a best fit line. This may help account for slight misplacement of workpieces 111. This best fit line is then compared to the equation of that same line in the gantry coordinate system to determine the relative rotation of the two coordinate systems.

A scaling factor may be applied to all camera coordinate system points. This scaling factor accounts for lens focal distance, lens distortion, or other issues. The scaling factor may be applied iteratively to the original Xc, Yc, and Rc coordinates to reduce overall error computed from the error feedback. The scale factor may be less than 0.5% in one example. For example, assume that a best fit line is used to create the axis in the camera coordinate system, which is then compared to the equation of that axis in the gantry system. The transformation equations may then be created based on these two lines. Following their creation, the original camera coordinates of each workpiece is then applied to these transformation equations. The resultant transformed coordinates from all of the workpieces 111 are then compared to the actual gantry coordinates to create an error function. A scaling factor is then applied to the transformation equations to attempt to minimize this error function. This scaling factor may be calculated iteratively until the error function is less than some predetermined threshold.

Use of this method calibrates a vision coordinate system to a robot coordinate system. Averaging multiple points and use of a scaling factor improves positional accuracy of the gantry module 103 relative to the workpieces 111.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. These other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of calibrating a robot, comprising:
   attaching an alignment tool to an end effector of said robot, where said end effector is part of a gantry module, where said alignment tool comprises one or more spaces, each space having three respective fingers;
   moving said end effector to a first location within a field of view of a camera;
   lowering said end effector;
   placing a respective workpiece in one or more of said spaces while pressing each workpiece against said respective three fingers, while said end effector is in said first location;
   saving a first set of coordinate locations for each space in said first location using a coordinate system referenced to said gantry module;
   moving said end effector without affecting a position of said workpieces from said first location to a second location within said field of view;
   placing a respective workpiece in one or more of said spaces while pressing each workpiece against said respective three fingers, while said end effector is in said second location;
   saving a second set of coordinate locations for each space in said second location using a coordinate system referenced to said gantry module;
   moving said end effector without affecting a position of said workpieces from said second location to a location outside said field of view;
   using said camera to capture an image of said workpieces after said end effector is moved to said location outside said field of view;
   determining a third set of coordinate locations for each workpiece using a coordinate system referenced to said camera; and
   calculating a transformation equation to transform coordinate locations in said coordinate system referenced to said camera to coordinate locations in said coordinate system referenced to said gantry module, using said first set, said second set and said third set of coordinate locations.

2. The method of claim 1, wherein said two of said fingers are disposed in a line segment to contact a first side of a workpiece, and said third finger is disposed nonlinearly to contact an adjacent perpendicular side of said workpiece.

3. The method of claim 1, wherein said coordinate system referenced to said camera is expressed in pixel locations and said coordinate system referenced to said gantry module is expressed in linear units of measurement.

4. The method of claim 1, wherein said first location comprises a position on a first conveyor belt, and said second location comprises a position on a second conveyor belt.

5. The method of claim 4, wherein at least two workpieces are placed on said first conveyor belt and at least two workpieces are placed on said second conveyor belt.

6. The method of claim 4, further comprising, prior to using said camera:
   moving said end effector without affecting a position of said workpieces from said second conveyor belt to a third conveyor belt within said field of view;
   placing a respective workpiece in one or more of said spaces while pressing each workpiece against said respective three fingers, while said end effector is at said third conveyor belt; and
   saving a fourth set of coordinate locations for each space in said third conveyor belt using a coordinate system referenced to said gantry module; wherein said fourth set of coordinate locations is used to calculate said transformation equation.

7. A method of calibrating a robot, comprising:
   performing an optical normalization process to determine vertical and horizontal conversion factors for a camera so as to convert pixel locations on an image captured by said camera to physical dimensions in a field of view of said camera;
   attaching an alignment tool to an end effector of said robot, where said end effector is part of a gantry module, where said alignment tool comprises one or more spaces, each space having three respective fingers;
   moving said end effector to a first location within said field of view of said camera;
   lowering said end effector;
   placing at least two workpieces in respective spaces by pressing each workpiece against said respective three fingers, while said end effector is at said first location;
   saving a first set of coordinate locations for each space using a coordinate system referenced to said gantry module;
   moving said end effector without affecting a position of said workpieces from said first location to a location outside said field of view;
   using said camera to capture an image of said workpieces after said end effector is moved to said location outside said field of view;
   determining a second set of coordinate locations for each workpiece using a coordinate system referenced to said camera; and
   calculating a transformation equation to transform coordinate locations in said coordinate system referenced to said camera to coordinate locations in said coordinate system referenced to said gantry module based on said first set and said second set of coordinate locations.

8. The method of claim 7, wherein said optical normalization process comprises:

placing a pattern having known dimensions within said field of vision of said camera;

using said camera to capture an image of said pattern; and converting said pixel locations in said image to said physical dimensions in said field of view, based on said known dimensions.

9. The method of claim 7, wherein said first location comprises a position on a conveyor belt.

10. The method of claim 7, wherein more than two workpieces are placed in respective spaces, and a best fit line is calculated based on said more than two workpieces, wherein said best fit line is used to calculate said transformation equation.

11. The method of claim 10, further comprising:

applying said second set of coordinate locations to said transformation equation;

determining an error function;

introducing a scaling factor to be used with said transformation equation to minimize said error function.

12. A workpiece handling system, comprising:

a gantry module comprising an end effector;

an alignment tool attached to said end effector, having a plurality of spaces, each space having three respective fingers and each space configured to accept a workpiece;

one or more conveyor belts;

a camera disposed above said conveyor belts; and a controller in communication with said camera and said gantry module, comprising a storage element comprising instructions, which when executed, perform a method of calibrating said system, said method comprising:

moving said end effector to a first conveyor belt within a field of view of said camera;

lowering said end effector;

waiting until a user places at least two workpieces on said first conveyor belt in respective spaces by pressing each workpiece against said respective three fingers;

saving a first set of coordinate locations for each space using a coordinate system referenced to said gantry module;

moving said end effector without affecting a position of said workpieces from said first conveyor belt to a location outside said field of view;

using said camera to capture an image of said workpieces after said end effector has moved to said location outside said field of view;

determining a second set of coordinate locations for each workpiece using a coordinate system referenced to said camera; and calculating a transformation equation to transform coordinate locations in said coordinate system referenced to said camera to coordinate locations in said coordinate system referenced to said gantry module based on said first set and said second set of coordinate locations.

13. The workpiece handling system of claim 12, wherein said storage element further comprises instructions, which, when executed, perform an optical normalization process to determine vertical and horizontal conversion factors for said camera so as to convert pixel locations on said image to physical dimensions in a field of view of said camera, wherein said optical normalization process is performed prior to moving said end effector.

\* \* \* \* \*